United States Patent [19]

Nealy

[11] Patent Number: 4,844,595

[45] Date of Patent: Jul. 4, 1989

[54] VIEWING DEVICE FOR FLOTATION BODY

[76] Inventor: Robert B. Nealy, P.O. Box 3154, San Clemente, Calif. 92672

[21] Appl. No.: 112,733

[22] Filed: Oct. 26, 1987

Related U.S. Application Data

[63] Continuation-in-part of Ser. No. 929,003, Nov. 10, 1986, abandoned.

[51] Int. Cl.[4] .............................................. G02B 27/02
[52] U.S. Cl. .................................... 350/319; 350/584; 350/418; 441/135; 114/66
[58] Field of Search ............... 350/319, 589, 584, 588, 350/418; 441/135; 114/66

[56] References Cited

U.S. PATENT DOCUMENTS

| | | | |
|---|---|---|---|
| 2,712,139 | 7/1955 | Kelly | 114/66 |
| 2,717,399 | 9/1955 | Backhouse | 441/135 |
| 3,081,726 | 3/1963 | Betts et al. | 350/319 |
| 3,733,981 | 5/1973 | Buchanan | 350/418 |
| 3,808,621 | 5/1974 | French | 350/418 |
| 4,116,529 | 9/1978 | Yamaguchi | 350/319 |
| 4,228,751 | 10/1980 | Robertson et al. | 441/135 |
| 4,497,550 | 2/1985 | Ouchi et al. | 350/584 |
| 4,655,559 | 4/1987 | Odell | 350/588 |

Primary Examiner—Bruce Y. Arnold
Assistant Examiner—Loha Ben
Attorney, Agent, or Firm—Plante, Strauss, Vanderburgh

[57] ABSTRACT

In accordance with the present invention a viewing device for flotation bodies is provided which comprises a body having an interior defined by its side walls and at least one transparent end wall. In one embodiment using two transparent end walls, the transparent end walls define spaced-apart viewing ports, one port being normally above the surface of the water and the opposite port being below the surface of the water. The interior of the body is adapted to be substantially condensation free by evacuating the interior of the body and sealing the body in the evacuated condition or, more preferably, filling the body with a fluid to the exclusion of air so that condensation and air bubbles are thereby avoided. In a preferred embodiment the viewing device consists of a single piece body having a single transparent end wall.

5 Claims, 4 Drawing Sheets

VIEWING DEVICE FOR FLOTATION BODY

RELATIONSHIP TO PENDING APPLICATIONS

This application is a continuation-in-part of my copending application Ser. No. 06/929,003, filed Nov. 10, 1986, now abandoned.

FIELD OF THE INVENTION

The present invention relates to a device for underwater viewing and more particularly to a viewing device for flotation bodies such as surf boards, body boards and the like.

BACKGROUND OF THE INVENTION

Underwater viewing has become increasingly popular as evidenced by the rapid growth of sports such as snorkeling and scuba diving. For the average person these sports take place in relatively shallow water, particularly in the case of snorkeling where one essentially floats on the surface of the water and views the bottom through a face mask. Similar results can be achieved without the discomfort of wearing breathing apparatus and face mask by the provision of a viewing device in a flotation body such as a surf board or body board or the like. Such viewing devices have been installed in inflatable air mats, paddleboards and the like. However, such view windows have been subject to a number of problems not the least of which is difficulty in viewing due to consideration of moisture on the inner surface of the window.

SUMMARY OF THE INVENTION

In accordance with the present invention a viewing device for flotation bodies is provided which comprises an open ended generally cylindrical body having an interior defined by its side walls and at least one transparent end wall. In an embodiment of the invention utilizing a single transparent end wall at the lower surface of the flotation body, the opening of the viewing device adjacent the upper surface of the flotation body may be left open to vent the interior of the device and avoid condensation. When utilizing a pair of transparent end wall at opposite end of the viewing device, the interior of the body is adapted to be substantially condensation free by means such as evacuating the interior of the body and sealing the body in the evacuated condition or, more preferably, filling the body with a fluid to the exclusion of air so that condensation and air bubbles are thereby avoided. In one embodiment of the invention, a vent is provided in one of the transparent end walls for ready ingress and egress of water. The vent is sealed during use to retain the water and to prevent any substantial introduction of air into the interior of the viewing device that may result in condensation on a viewing port or otherwise inhibit viewing.

The viewing device may be installed in the flotation body at the time of the manufacture of the flotation body or may be supplied in kit form for installation in an already existing flotation body. In the latter case, the viewing body may be axially adjustable so that it is readily adjusted to the thickness of the flotation body in which it is being installed. Accordingly, the viewing device of the present invention may comprise two members, each of which is sealed at one end and open at the opposed end. The members are joined at their open ends and are axially movable with respect to one another for adjustment of the distance between the transparent end walls of the viewing device to adapt the device for installation in flotation bodies of different thickness. Preferably the members are provided with corresponding threads for threadable adjustment of the axial distance between the end walls of the viewing device. Where the viewing device comprises a unitary body, the device is sufficiently flexible for installation in the flotation body and flexible flanges are provided to compensate for differences in thickness of the various flotation bodies.

In yet another embodiment of the invention, the inner surface of the opening in the flotation body in which the viewing device is installed defines the side walls of the viewing device. The opening in the flotation body is closed by upper and lower transparent members which define the transparent end walls of the viewing device. The transparent member on the upper surface of the flotation body is preferably provided with vent means to avoid condensation in the interior of the viewing device.

The viewing device is preferably provided with an outwardly extending flange adjacent each of the end walls which may be formed as part of the body of the device or which comprises an extension of the transparent end wall. The flanges act to clamp the viewing device to the flotation body and to compensate for minor differences in the thickness of different flotation bodies on which the viewing device may be installed. Additionally the flange adjacent to the upper surface of the flotation body may be provided with a surface which slopes downwardly toward the edge of the flange to provide a sloped upper surface surrounding the transparent end wall to aid in draining water away from the transparent end wall during use of the device.

Although the viewing device has heretofore been described as comprising two transparent end walls, it will be understood that the viewing device of the invention may comprise a single transparent end wall which is located adjacent the upper or the lower surface of the flotation body. When located at the upper surface of the flotation body, the transparent end wall is provided with vent means in accordance with the invention to prevent the retention of air bubbles and to avoid condensation. In addition, a soft pliable splash guard can also be provided about the upper end wall to further screen water away from the end wall.

BRIEF DESCRIPTION OF THE DRAWINGS

The invention will be further described in connection with the detailed description which follows taken in conjunction with the drawings in which.

DETAILED DESCRIPTION OF THE INVENTION

Figure 1:
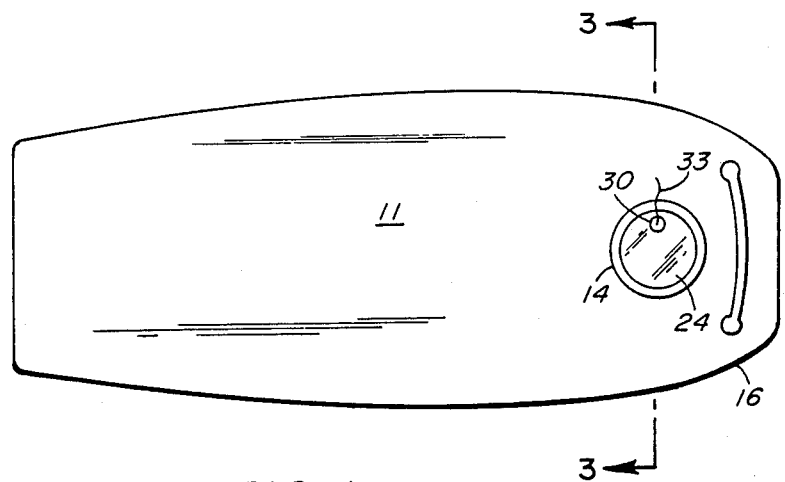
FIG. 1 is a top plan view of a flotation body incorporating a viewing device in accordance with the present invention.

Referring to FIG. 1 there is illustrated a flotation body 11, having an upper surface 16 and a lower surface 17, in which is installed a viewing device, shown generally as 14, preferably at the bow end thereof, so that a person can view the undersurface of the water through the viewing device while riding on the flotation body. The flotation body 11 is sufficiently buoyant to float in salt or fresh water, and in the embodiment illustrated is constructed of an expanded foam plastic material. It will be understood, however, that the flotation body 11 can be constructed of any suitable buoyant material. The floation body 11 is provided with an opening 19 which extends through the thickness of the flotation body and communicates with the upper surface 16 and the lower surface 17 thereof. The opening 19 is sized and configured to receive the viewing device 14.

Figure 2:
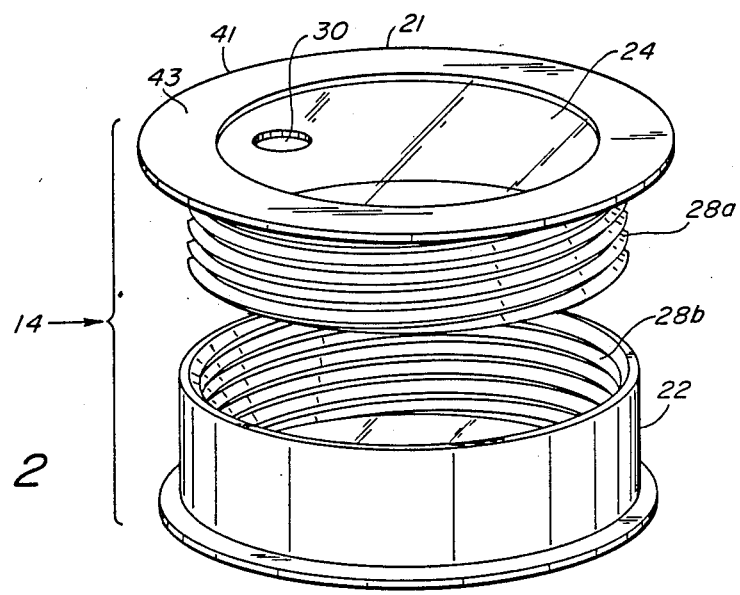
FIG. 2 is an exploded perspective view in enlarged scale of the viewing device installed in the flotation body of FIG. 1.
Figure 3:
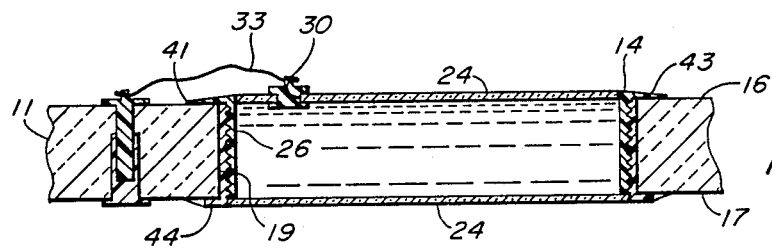
FIG. 3 is a cross-section taken through section line 3—3 of the viewing device of FIG. 1.

Referring to FIG. 2 and FIG. 3, members 21 and 22 each of which are sealed at one end by a transparent port 24 and which are open at their opposite ends. In the preferred embodiment the bore of the member 22 is slightly larger than the outside diameter of the member 21 so that the open end of the member 21 is received in the bore of the member 22. In this fashion when the open ends are joined together to define an interior 26 of the viewing device 14, the members 21 and 22 can move in an axial direction with respect to one another so that the viewing device can be adjusted to conform to the thickness of the flotation body 11 in which it is installed. In the embodiment as illustrated in FIG. 2, corresponding thread elements 28a and 28b are provided about the outside diameter of the member 21 and on the inner wall of the bore of the member 22 for drawing the members tightly together when installed in the board and for threadably adjusting the distance between the ports 24 of the respective members of the viewing device 14.

When the members 21 and 22 are assembled, communication to the interior 26 of the viewing device 14 is afforded by vent means which, as illustrated in its simplest form, comprises an opening 30 in the transparent port 24 which is located at the upper face of the flotation body 11. A plug 31 is provided to seal the opening 30 and preferably a leash 33 is attached between the plug and a suitable anchoring means such as a a plastic bolt 35 provided in the flotation body 11 adjacent the viewing device 14 to prevent accidental loss of the plug. Needless to say a more complex vent mechanism may be employed, such as, for example, a one way valve mechanism which can operate to permit air to escape from the interior but which prohibits air from entering.

The design and operation of such valve mechanisms are well known in the art and form no part of this invention.

In operation the flotation body 11 is submerged in the water sufficiently to permit water to enter the interior 26 of the viewing device 14 through the opening 30. When the interior 26 is completely filled with water the opening 30 is sealed with the plug 31 to prevent loss of water from the interior 26 of the viewing device 14 and the entrance of air. In this fashion, the interior 26 of the viewing device 14 is adapted to be condensation free since it is completely filled with water. In alternative forms of the invention, the interior 26 of the viewing device 14 may be evacuated or filled with a moisture free fluid and the body sealed to prevent loss of vacuum or loss of fluid and to prevent the introduction of air into the interior of the viewing device. In such a case it is highly desirable to coat the inner surface of the ports 24 with a transparent hydrophobic material to further prevent any condensation. Synthetic detergents or natural soaps, being at least partially hydrophobic, are suitable for this purpose.

Figure 4:
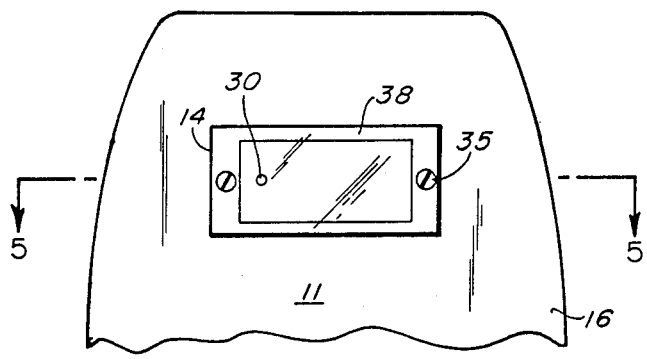
FIG. 4 is a top plan view, partially broken away for purposes of illustration, of another embodiment of the present invention.
Figure 5:
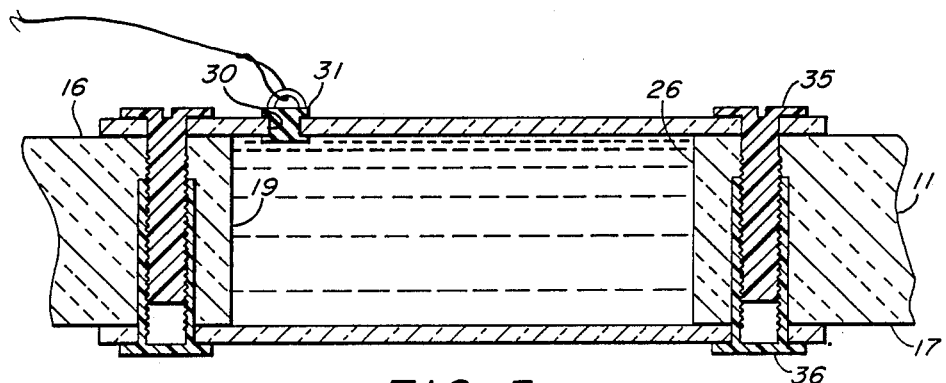
FIG. 5 is a sectional view taken through lines 5—5 of the viewing device of FIG. 4.

In yet another embodiment of the invention, illustrated in FIGS. 4 and 5, the sidewalls of the viewing device 14 are defined by the inner surface of the opening 19 in the flotation body 11. As illustrated in FIGS. 4 and 5 a transparent plate is suitably fastened onto the upper and lower surface of the flotation body 11 to serve as the end wall to seal the opening 19 therein and to provide the transparent port 24 for the viewing device 14. The side walls of the viewing device 14 therefor are defined by the inner surface of the opening 19. This presents very little problem of the proper functioning and operation of the viewing device 14 even with flotation bodies made with foam materials, since the foam bodies are normally of closed cell construction so that the interior 26 of the viewing device can be filled with water or otherwise treated as described above to maintain the interior in a condensation-free condition. The transparent plate may be bonded to the flotation body 11 or may be fastened by plastic bolts 35 and corresponding threaded sleeve 36. In all other respects, the function and operation of the viewing device 14 illustrated in FIG. 4 and FIG. 5 is the same as for that illustrated in FIG. 2 and FIG. 3.

In operation, particularly with heavy adults, the upper surface 16 of the flotation body 11 is at times submerged. Accordingly, it is desirable to provide means for quickly draining water away from the port 24 of the viewing device 14 and in that regard, as is most clearly illustrated in FIG. 2 and FIG. 3, a flange 41 is provided around the end of the viewing device 14 at the upper surface 16 of the flotation body 11. The upper surface 43 of the flange 41 is sloped downwardly as it extends outwardly from the member 21 so as to define a sloped or concave surface about the transparent port 24 to permit quick drainage of water away from the port.

In the embodiment illustrated in FIG. 3 an outwardly extending flange 44 is also provided around the end of the viewing device 14 at the lower surface 17 of the flotation body 11. Preferably the exposed surface of the flange 44 is essentially flush with the lower surface 17 of the body 11 to reduce water resistance. In addition, the flange 44 cooperates with the flange 41 to retain the viewing device 14 in the flotation body 11.

Figure 6:
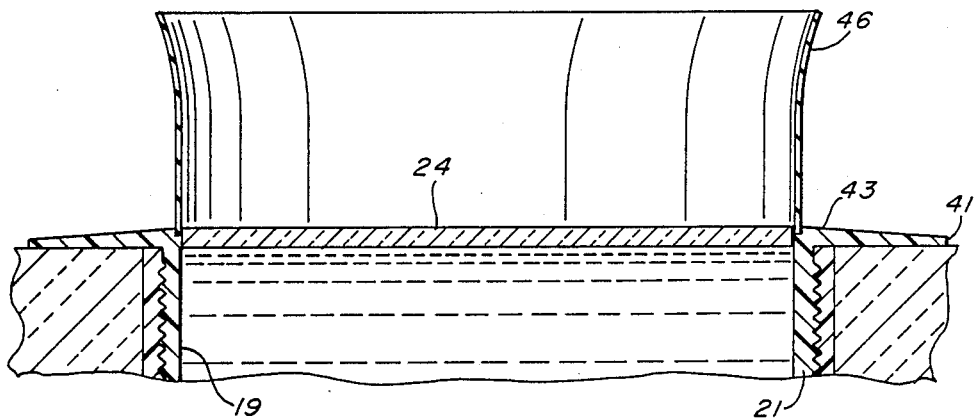
FIG. 6 is a sectional view, broken away for compactness of illustration, illustrating a splash guard installed about one transparent end member of the viewing device of the present invention.

As a further aid in maintaining a clear view through the viewing device 14 an additional splash guard 46 (FIG. 6) can be disposed about the port 24 or the transparent plate on the upper surface 16 of the flotation body 11. As illustrated in FIG. 6, the splash guard is a soft, pliable, upstanding open ended member which is sealed at one open end about the transparent end wall of the viewing device 14 in the upper surface 16 of the flotation body 11 or integrally formed as an extension of the viewing device 14. In this manner, except in unusually choppy conditions, the water is prevented from reaching the transparent end wall. Any suitable soft material such as rubber sheet may be utilized for this purpose and it will be clear that the splash guard should be soft and pliable in order to prevent injury to users of the flotation body 11.

As mentioned above, it is not necessary that the viewing device include two transparent end walls and in accordance with certain embodiments of the invention the viewing device may incorporate a single transparent end wall, either at the opening adjacent the upper surface of the flotation body or in the opening adjacent the lower surface of the flotation body. As with the other embodiments of the invention, the viewing device may comprise a unitary body or may comprise several components which are assembled to form the viewing device 14 of the present invention.

Figure 7:
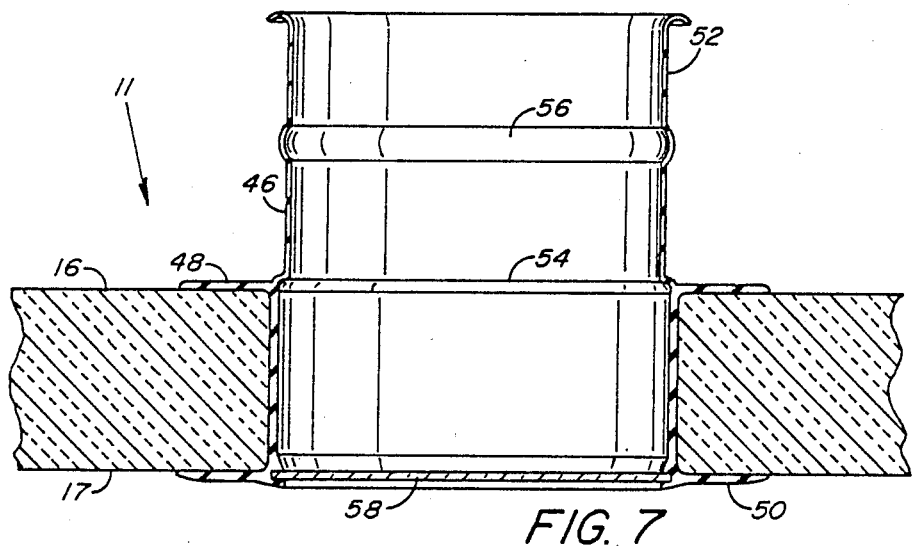
FIG. 7 is a sectional view, broken away for compactness of illustration, illustrating a single piece viewing device having a single transparent end wall adjacent its lower end and including a collapsible splash guard installed around the open upper end.
Figure 8:
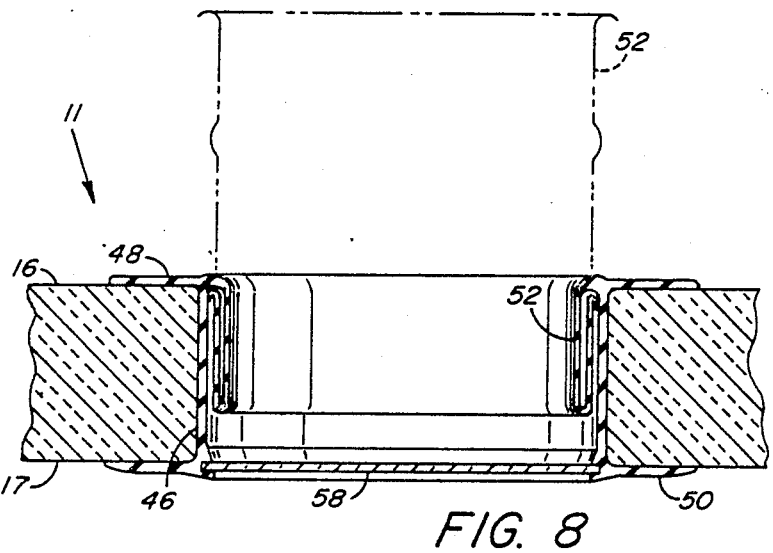
FIG. 8 is sectional view, partially broken away for compactness of illustration, of the device of FIG. 7 showing the splash guard in the collapsed mode.

Referring to FIGS. 7 and 8 there is illustrated a viewing device comprising an open ended cylindrically shaped unitary body 46 with one open end terminating adjacent the upper surface 16 of the floation body 11 and the opposite open end adjacent the lower surface 17 thereof. A radially outwardly extending upper flange 48 is located on the outer wall of the body 46 at its opening adjacent the upper surface 16 of the flotation body 11 while a radially outwardly extending lower flange 50 is disposed on the outer wall of the body 46 adjacent the lower surface 17 of the flotation body 11. The design and function of the flanges 48 and 50 is the same as already described in connection with flanges 43 and 44 shown in FIG. 3. The body 46 extends axially beyond the upper flange 48 to define a splash guard 52 which can be folded inwardly along lines 54 and 56 to a nested position in the body 46 for ease in transporting the flotation body 11 as shown in FIG. 8.

Figure 9:
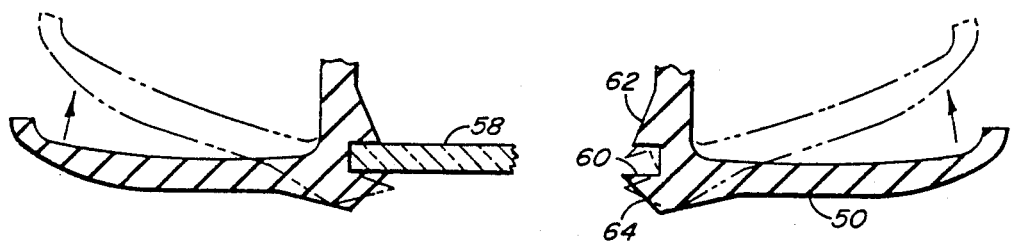
FIG. 9 is a sectional view of the lower end of the device of FIG. 7 in enlarged scale showing the removable transparent end wall.

A transparent lens 58 is located in the body 46 at its lower opening adjacent the lower surface 17 of the flotation body 11 to serve as a single transparent end wall. The lens 58 may be permanently affixed in the body 46 or preferably, as shown in FIG. 9, may be removably disposed in the body 46. As illustrated, a channel 60 is defined in the wall of the body 46 between a radially inwardly extending upper lip 62 and a radially inwardly extending lower lip 64. In the preferred embodiment illustrated, the lower lip 64 extends inwardly more than the upper lip 62 so as to provide greater contact area between the lens 58 and the lower wall of the channel 60 to insure retention of the lens 58 in the channel 60 when the viewing device is installed in the flotation body 11. The lens can be conveniently removed from the body, however, by rotating a portion of the lower flange 50 upwardly away from the lower lip 64 which spreads the walls of the channel 60 and by virtue of the shorter inward extension of the upper lip 62 permits the lens 58 to be removed from or inserted into the channel 60. Removal and insertion of the lens 58 is most conveniently carried out with the viewing device removed from the flotation body 11 to allow for the movement of the lower flange 50 as described. However, the lens 58 may be removed or inserted when the viewing device is installed in the flotation body 11 by exerting a downward force against the upper end of the body 46 moving it axially in the opening 30 of the flotation body 11 so that the lower flange 50 is spaced from the lower surface 17 of the flotation body 11 for movement in the manner described to remove or insert the lens 58 in the channel 60. The body may be adapted, such as by the provision of a threads adjacent the lower opening for securing a lens cover to protect the lens during such times as the viewing device is not being used.

The body 46 is preferably molded in a single piece utilizing a flexible material having some resistance to ultraviolet radiation such as urethane or vinyl based polymeric compositions. Such materials have sufficient spring or resilience to return to their original shape after deformation and such materials are sufficiently flexible to permit folding of the splash guard 52. It will also be noted that both the upper flange 48 and the lower flange 50 are preferably of a flexible nature and, as shown in FIG. 9, the inner faces of the flanges are dished shaped so that the flanges will fit snugly against the surfaces of flotation bodies of different thicknesses or which have non-uniform surfaces.

Figure 10:
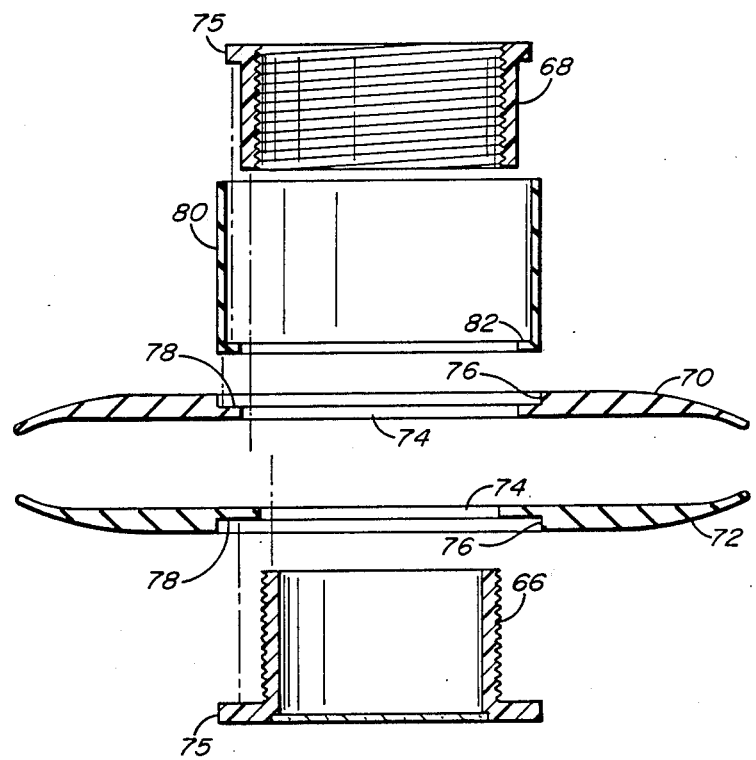
FIG. 10 is a sectional view of the viewing device in disassembled kit form.

The viewing device of the invention may be provided in disassembled form, preferably as a kit, for subsequent assembly and installation on a flotation body. As shown in FIG. 10 such a kit comprises a threaded male member 66, a corresponding female member 68 having an internally threaded end portion for receiving the threaded end portion of the male member 66. The male member 66 and the female member 68 are provided with an enlarged collar 75 at one end opposite the threaded end. The kit further includes an upper flange 70 and a lower flange 72. The flanges, 70 and 72, are each provided with a central opening 74 of sufficient diameter as to receive the members 66 and 68. The flanges 70 and 72 define generally concave outer surfaces which are recessed about the opening 74 to define a bore 76 to receive the collar 75 of a member 66 or 68. A flexible splash guard 80 inwardly turned at its lower end to define a shoulder 82 which is adapted to be clamped between the bottom surface 78 of the bore 76 and the collar 75 of the member 68, is provided to complete the viewing device in its disassembled form.

Assembly and installation is readily carried out on an existing flotation body by providing an opening through the flotation body of sufficient size to receive the members 66 and 68. The flanges 70 and 72 are placed on the upper and lower surfaces respectively of the flotation body with their central opening aligned with the opening in the flotation body. The splash guard 80 is inserted in the bore 76 of the upper flange 70 and the corresponding threaded ends of the male member 66 and the female member 68 are inserted from opposite sides through the central opening 74 of the flanges 70 and 72 into the opening in the flotation body and threaded tightly together causing the collars 75 to bear against the floor surface 78 of the bore 76 of the flanges 70 and 72 urging the flanges 70 and 72 against the upper and lower surfaces of the flotation body to clamp the assembled device on the flotation body. When utilized, the splash guard 80 is secured by clamping its shoulder 82 between the collar of either member 66 or 68 and the floor surface 78 of the bore 76 of the upper flange 66.

Either the male member 66 or the female member 68 may be located on the upper surface of the flotation body and their positions may be reversed without affecting the operation of the viewing device. As has been already described both the male member 66 and the female member 68 may be provided with means for removably retaining a transparent lens which defines an end wall for the viewing device.

While the invention has been described herein in conjunction with certain preferred embodiments thereof, it will be apparent that it may be changed, modified or substitutions made thereto by one having ordinary skill in the art without necessarily departing from the spirit and scope of the invention:

I claim:

1. The combination of a flotation body having an opening communicating between the upper and lower surfaces thereof and a viewing device disposed in said opening, said viewing device comprising a cylindrically shaped body sealed at one end by a transparent end wall and open at its opposite end, said transparent end wall being disposed adjacent the lower surface of said flotation body, a radially outwardly extending flange on the outer surface of said cylindrically shaped body at the sealed end thereof, a corresponding radially outwardly extending flange disposed on the outer surface of said cylindrically shaped body adjacent the upper surface of said flotation body, a splash guard disposed on said viewing device adjacent the upper surface of said flotation body, said splash guard being foldable between a nested position in said cylindrically shaped body of said viewing device and an extended position.

2. The combination of claim 1 further including spaced apart radially inwardly extending upper and lower lips disposed on the inner wall surface of said cylindrically shaped body defining therebetween a channel for removably retaining an edge portion of said transparent end wall.

3. An underwater viewing device comprising:

a first and second corresponding open ended members, each of said first and said second members having an enlarged collar at one end thereof, at least said first member being adapted at one open end thereof for retaining a lens for sealing said open end, said second member being dimensioned to receive an end portion of said first member opposite said collar and having means for retaining said end portion of said first member therein;

an upper flange element and a lower flange element, each of said elements having a central opening of sufficient diameter to receive the ends of said members opposite said collars, an outer surface of each of said elements being generally concave and recessed in the area of said central opening for receiving said collar of one of said members, a transparent lens for sealing the open end adjacent said collar of at least one of said members.

4. The viewing device of claim 3 further including a splash guard comprising an open ended body being inwardly turned at one end to define a shoulder for clamping between said collar of one of said members and the recessed area of said upper flange element when said viewing device is assembled.

5. The viewing device of claim 3 wherein one of said members is adapted for removably retaining said transparent lens at an end opposite said collar.

* * * * *